Nov. 3, 1970     W. C. SCHMIDT     3,537,824
APPARATUS FOR RENDERING MATERIALS BY BATCH
OR CONTINUOUS PROCESS SELECTIVELY
Filed April 17, 1967     2 Sheets-Sheet 1
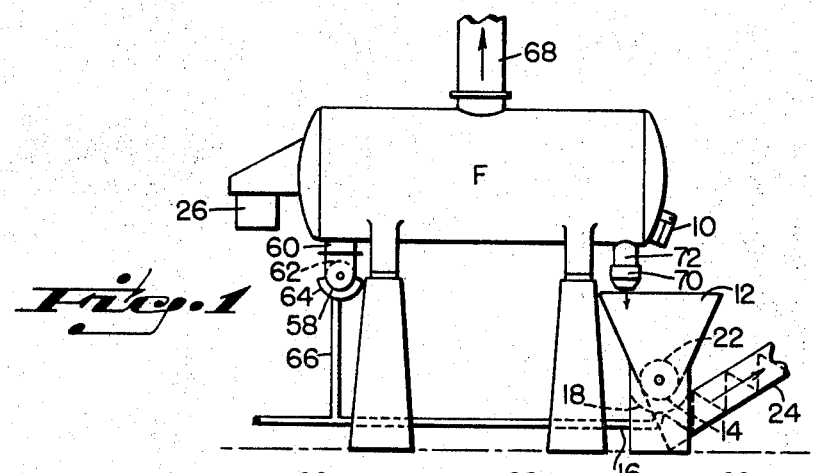
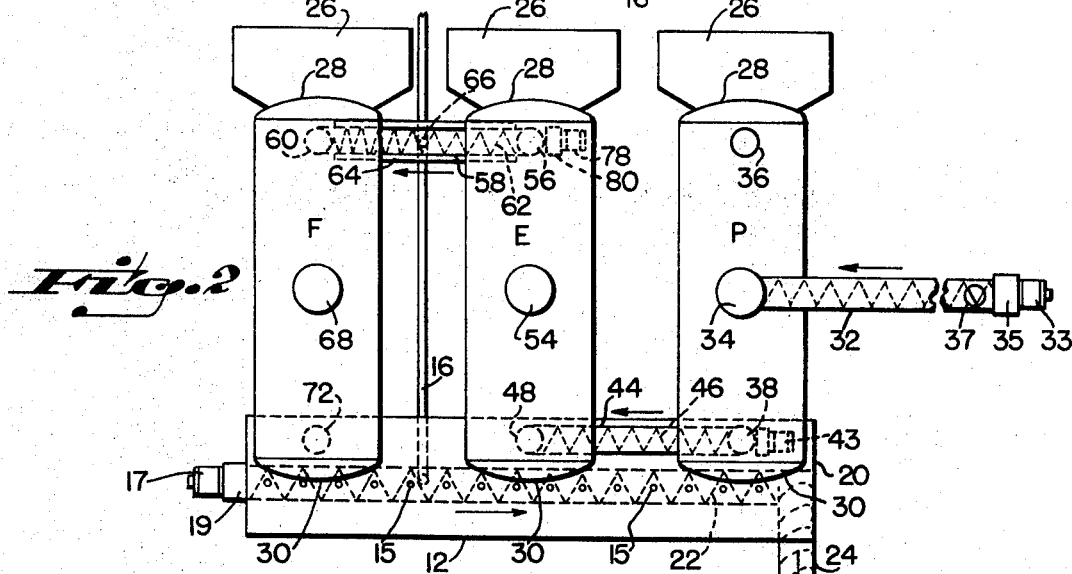
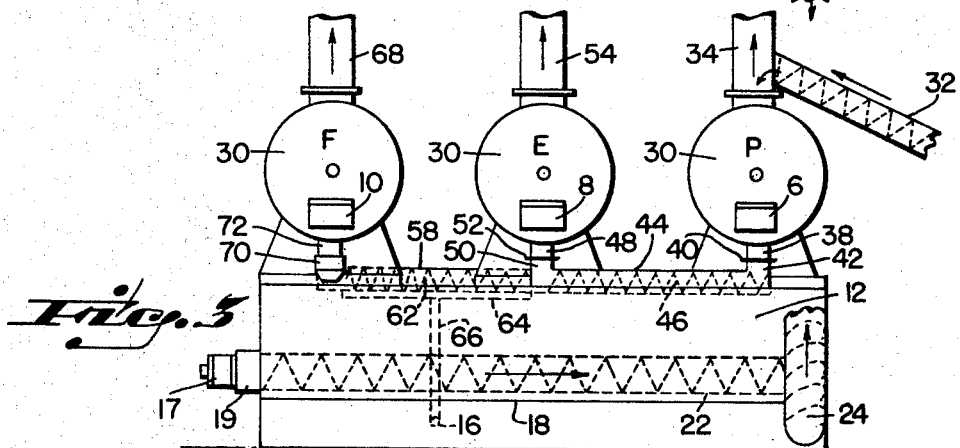
INVENTOR.
WILLIAM C. SCHMIDT
BY
*J. Warren Kinney Jr.*
ATTORNEY

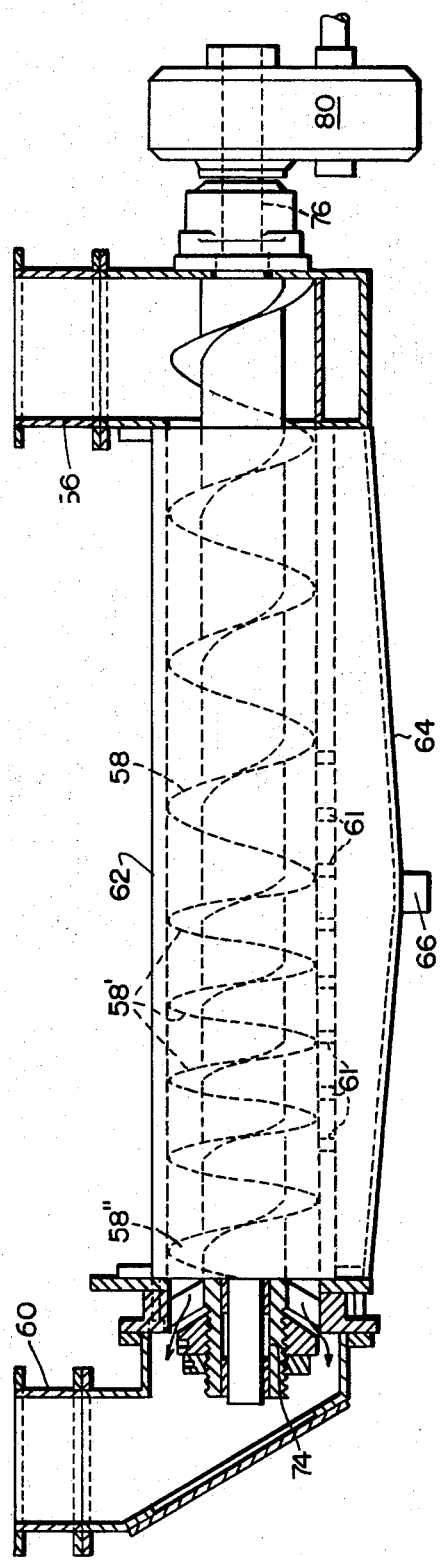

United States Patent Office 3,537,824
Patented Nov. 3, 1970

3,537,824
APPARATUS FOR RENDERING MATERIALS BY BATCH OR CONTINUOUS PROCESS SELECTIVELY
William C. Schmidt, Cincinnati, Ohio, assignor to Cincinnati Butchers Supply Company, Cincinnati, Ohio, a corporaton of Ohio
Filed Apr. 17, 1967, Ser. No. 631,366
Int. Cl. B01d *43/00;* C11b *1/12;* A23c *19/12*
U.S. Cl. 23—280                                   17 Claims

ABSTRACT OF THE DISCLOSURE

The apparatus may be used alternatively, to render a fat or oil-bearing material by either the batch or the continuous process. A pre-press transfer conveyor between the evaporator and the finisher shortens the rendering period and results in the production of end products of superior quality. Automatically operated transfer conveyors advance the renderable material through several stages of treatment when the apparatus is used for continuous processing, and the end products are automatically accumulated and stored while processing of additional material progresses. The same apparatus, unaltered, may be used in batch-rendering of materials having differing characteristics, without intermixing of sucessive batches. Floor space requirements of the apparatus are minimal.

---

The present invention relates to a method and apparatus for rendering materials by the batch or by the continuous process, selectively, without alteration of the rendering apparatus.

Materials commonly rendered may consist of any suitable type of animal matter, such as bones, cartilage and the like, and all such matter generally referred to as offal. The constituents usually are first mashed, shredded or otherwise cut up, hashed or ground, to produce a slurry or fluid mass that may be pumped or moved by screw-conveyors in the course of processing. In this form, the material properly may be referred to as the starting material, or the prepared raw material.

Rendering of the starting material involves treatment thereof to remove water and to separate the oil or fat content from the solids. The solids emerge finally as a material which is largely free of water, oils and fats, and which may be compressed to cake or crackling form.

It must be understood that a prepared starting material to be rendered may include substances and ingredients other than animal matter, such as for example various oil-bearing materials that may be classed as vegetation, and which may be subject to the processing herein to be disclosed.

It has been found desirable in the art of rendering, to adapt the process and the rendering equipment for versatility of usage, so that the starting material may be treated either by the continuous rendering method, or by the batch rendering method, as changing conditions may warrant. By reason of the selectivity of methods made possible, without requiring any changes in the rendering equipment, the rendering plant may be operated at great efficiency and with very substantial savings of time, labor and fuel. By making possible the switch from batch rendering to continuous rendering and vice versa, using the same equipment without alteration, the equipment may be kept in full service, and processing may be performed upon different types of starting materials alternatively, or as they become available for processing at the rendering plant. Such advantages are of great importance to the economy and efficiency of rendering plant operation on a competitive basis.

A principal object of the present invention is to provide a process and suitable apparatus for the rendering of fat or oil-bearing materials, which process and apparatus may be used selectively or alternatively to treat such materials by either the batch method or the continuous method of treatment, without necessitating any physical changes in the apparatus employed.

Another object of the invention is to provide an improved method and means in connection with the rendering apparatus, for reducing the processing time period and thereby enhancing the efficiency and the output of the rendering apparatus.

A further object of the invention is to provide rendering apparatus which is automatically operated and controlled.

Another object is to incorporate in a rendering apparatus a novel pre-press device for improving the end products of the rendering process and reducing the processing time.

The foregoing and other objects are attained by the means described herein and illustrated upon the accompanying drawings, in which:

FIG. 1 is a side elevational view of the rendering apparatus embodying the improvements of the present invention.

FIG. 2 is a top plan view of the same.

FIG. 3 is an end view of the apparatus.

FIG. 4 is a side elevational view of a pre-press transfer conveyor forming part of the present invention.

With reference to the drawings, there is shown a plurality of cookers designated the preheater P, the evaporator E, and the finisher F, arranged in a row and at a common elevation so that their discharge doors or valves 6, 8 and 10 may discharge into a common trough 12. The trough may comprise part of a device commonly known as a percolator, whose function is to separate the liquid constituents from the solid constituents of a mass delivered thereto by one or more of the cookers. The bottom 14 of trough 12 may be perforated as at 15 to release liquid grease to a collector pan 18, which pan may be drained by a pipe 16 connected to a suitable storage receptacle, not shown. Solids remaining in the perforated bottom of trough 12 may be conveyed toward one end 20 of the trough by means of a conveyor screw 22 driven by a motor 17 and speed reducer 19. The solids compiled by screw 22 may be removed from the trough by means of an electric motor-driven draw-off conveyor 24, which may deposit the solid material in a suitable press operative to express residual liquids and produce a cake or crackling.

The cookers P, E and F may be of conventional design, comprising usually an elongate cylindrical tank provided with a steam jacket for heating the contents thereof. Within each tank is journalled a rotary agitator usually in the form of a helical screw, having geared connection with an electric motor drive unit 26 (FIG. 1), for actuating the agitator. The agitator may be heated as by means of steam circulated through hollow portions thereof in accordance with common practice, and the speed of rotation of the agitator preferably is subject to regulation, as by means of an electric motor speed control, or by means of suitable speed-change gearing associated with unit 26.

Separate drive units 26 may be located at the corresponding ends 28 of the several cookers, opposite the ends 30 which carry the discharge doors or valves 6, 8 and 10. The cooker agitators accordingly will be understood to have separate driving means, and if desired, the agitators may be driven at different speeds of rotation. Also, any one or more of the agitators may be stopped while others are in motion, this being at the will of an operator attending the apparatus.

Means is provided for charging the cooker or preheater P with a quantity of prepared starting material, and such charging means may be in the form of a feed screw conveyor 32 or equivalent means driven by an electric motor 33 and speed reducer 35. The material may be introduced at vapor stack 34 as shown, or at a charging port 36 located near the rear end 28 of preheater P, as desired (FIG. 2). Port 36 may be located in the bottom of preheater P, or if desired, said port may be located in the top of the preheater as indicated at 36. In either case, the preheater may be charged with a quantity of prepared starting material entering the feed conveyor at 37.

Near the forward end 30 of preheater P, and in the bottom thereof, is provided a discharge port 38. Said port 38 is coupled at 40 to an end 42 of a transfer conveyor tube 44 wherein is operative a rotary conveyor screw 46 drivable by means of an electric motor 43 and speed reducer 45 mounted preferably upon the end 42 of conveyor tube 44 (FIG. 2). The motor for driving the screw 46 is to be wired in conjunction with a thermostatic sensing device responsive to the temperature of material within the preheater, so that as the material within the heater reaches a predetermined temperature, usually about 212° F., the motor for driving screw 46 will be energized causing said screw to withdraw material from preheater port 38 and transfer said material to evaporator E through the bottom entry port 48 thereof.

It will be understood that the end portion 50 of conveyor tube 44 is coupled to port 48 at the flange 52, and that port 48 is located near the forward end 30 of evaporator E.

Within evaporator E the material is agitated and heated further to rapidly drive moisture therefrom through stack 54, and to liquefy and release the oils and fats therefrom. The evaporator near its rear end 28 is provided with a bottom discharge port 56 to which is attached one end of a screw conveyor tube or housing 58, the opposite end thereof being connected to an entry port 60 in the bottom of finisher F, near its end wall 28. The conveyor screw 62 within tube 58 is adapted to be driven by means of an electric motor 78 and speed reducer 80 mounted, preferably, upon one end of said tube. The motor when energized rotates the screw 62 in proper direction to effect transfer of heated material from evaporator E to finisher F, through the ports 56 and 60.

The motor which drives transfer conveyor screw 62 is to be wired in an electric circuit which includes a thermostatic sensing device having a circuit-closing switch operative to energize the motor whenever the temperature of material in evaporator E reaches and exceeds a predetermined value, and to open the switch for de-energizing the motor when the temperature falls below such predetermined value. The temperature at which the motor switch is closed by the thermostatic sensing device may approximate 212° F., or boiling temperature.

It should here be noted that transfer conveyor 58, 62, is a pre-press conveyor, that is, a conveyor which acts to squeeze and remove oils and fats from the heated material being advanced toward port 60 of finisher F. For this purpose, the tube or housing 58 may be provided with a multiplicity of bottom perforations through which fluid fats and oils may be released as the screw 58 rotates. The fats and oils released through said perforations may be gathered in a pan 64 beneath the conveyor, and may then be piped from pan 64 through a conduit 66, to any suitable storage receptacle. If desirable or convenient, the conduit 66 may deliver the accumulated fats and oils to pipe 16 which drains the trough pan 18.

The pre-press conveyor above mentioned may incorporate a conveyor screw especially adapted for compressing the material undergoing transfer thereby. Such screw may comprise flights or convolutions which are progressively more closely pitched or spaced from one another in the direction of the discharge end of the screw, thereby to progressively compact the material undergoing advancement. Thus, in FIG. 2, material advanced by screw 62 will be gradually subjected to increasing compression as the material approaches port 60, thereby to express oils and fats from the material into pan 64 before the residue enters finisher F at port 60, as will be more fully explained.

By the time the material enters finisher F, it will have been relieved of most of its moisture, fats, and oils. In this condition, the material responds readily to final heat treatment within the finisher, to yield its remaining low-quantity contents of moisture, fats and oils, the moisture being discharged as vapor through stack or vent 68. When the temperature within finisher F reaches a preselected maximum, usually 220° to 275° F., depending upon the nature of the material in process and the results desired, the dehydrated material may be released automatically through a temperature-controlled discharge valve 70, for deposit into trough 12 (FIG. 1). As was previously mentioned, trough 12 is provided with a series of bottom perforations 15 for draining fats and oils from the material deposited therein, and the drainage is carried off by pan 18 and conduit 16.

In a preferred automatic construction, electrical devices may be provided to effect energization of the driving motors of screw 22 and 24 concurrently with opening of the automatic discharge valve 70, and for a predetermined period of time thereafter. Alternatively, however, the driving motors of screws 22 and 24 may be energized either constantly, or at the will of an attendant, as may be desired.

The reference character 72 indicates a discharge port in the bottom of finisher F, which may support the automatic temperature-controlled discharge valve 70 delivering material into trough 12.

Under the continuous processing procedure, the raw material is treated as above explained, that is, the raw material is conveyed into preheater P where it is cooked or boiled at about 212° F. After sufficient boiling to remove some of the water therefrom, conveyor 46 is started in motion automatically by heat-sensitive means associated with preheater P, to effect transfer of material to evaporator E. During or subsequently to such transfer of material, feed conveyor 32 is to be automatically actuated for recharging the preheater with fresh raw material.

The material transferred to evaporator E is subjected to cooking therein at about 212° F., to effect a rapid vaporization of moisture which leaves through stack 54. After most of the moisture is removed from the material in evaporator E, a control device responsive to the temperature of material within the evaporator energizes the motor of pre-press conveyor 62. The pre-press conveyor while operating to transfer material from the evaporator E to finisher F, expresses most of the fats and oils from the material so that the material enters the finisher in relatively dry condition.

In finisher F, the material is subjected to final cooking to break down the remaining fats and oils, and remove practically all moisture from the material. This final cooking may be performed at temperatures ranging between 220° and 275° F., depending upon the nature of the material and the results to be achieved. In a typical procedure, the final cooking temperature within the finisher may approximate 240° to 245° F.

Upon termination of the final cooking period in finisher F, the thermostatically-controlled automatic valve 70 opens to discharge the material into the bottom-perforated trough 12, wherein residual fats and oils are removed and the solid constituent is conveyed from trough 12 by conveyor screws 22 and 24. As previously stated, the screws 22 and 24 may be actuated automatically upon release of material through valve 70, or if desired, said screws may operate either continuously or under the control of an attendant.

The continuous rendering process above described requires little if any attention or supervision, and a proper degree of material treatment is assured in each of the cookers P, E and F, at all times. Conveyor screws 46 and 62 when idle, will perform the function of valves between the several cookers.

Batch rendering, as well as continuous rendering, may be performed with the apparatus disclosed, requiring no alteration of the apparatus. Use of the same apparatus for both types of rendering is highly advantageous, in that it effects great savings of time, labor, and fuel, and makes possible an economical, immediate movement of different types of raw material through the plant as such different materials become available for processing.

To batch-render a raw material, any one or more of the cookers P, E, F, may be selected for use. The selected cooker may be charged with raw material in the usual manner, and operated to agitate and heat the material until moisture evaporation and cooking to release the fats and oils, reaches the desired terminal stage. Then the discharge door of the selected cooker, for example door 10 of cooker P, may be opened slightly to release to trough 12 the more fluid constituent of the batch, which includes the liquefied fats and oils. The fats and oils will drain off through the perforations 15 of trough 12.

After the fats and oils have been thusly released from the cooker through the discharge door, the door may be opened fully to permit release of the solids, which upon entering the trough 12, will be drained of any residual fats and oils as conveyors 22 and 24 operate to remove the solids from the trough.

Opening of the discharge door in stages as above explained, and actuation of conveyors 22 and 24, may be accomplished automatically by means of heat responsive sensing devices which control the operation of suitable motors for opening and closing the discharge door, and for starting and stopping the conveyors 22 and 24. Such sensing devices may be responsive to changes of temperature occurring in the material undergoing treatment within the cooker; or if desired, the automatic controlling of the process steps may be effected by suitably adjusted timing devices arranged to initiate movements of the conveyors and the discharge door.

It should be appreciated that by virtue of the arrangement of elements herein disclosed, batch rendering may be performed in all of the cookers simultaneously, if desired, or in any one or two cookers that may be selected for the purpose. The change-over from batch rendering to continuous rendering, and vice versa, can be effected at any time without changes in the apparatus, but with marked economic advantages as hereinbefore stated. The apparatus, furthermore, is designed for installation with all components on a common level and with minimal space requirements.

FIG. 4 is a detailed disclosure of pre-press conveyor 58, 62, and shows the flights or convolutions of screw 58 reduced in pitch in the direction of entry port 60 of the finisher F, to express fats and oils into pan 64 while transferring cooked material to the finisher. It will be noted that the screw flights 58' disposed near the discharge end of the screw are reduced as to pitch for compressing the cooked material as it advances from port 56 to port 60. Expressed fats and oils therefrom may leave the conveyor housing through suitable bottom openings 61, to be gathered by pan 64. The last flight 58" of the conveyor screw adjacent to the port 60 of the finisher F, and perhaps also one or more flights next to the last, may be increased as to pitch in comparison with the pitch of the reduced-pitch flights 58'. The purpose of this is to decrease the compression of material entering the finisher, and to break up the compressed material while speeding the feed thereof into the finisher.

Opposite ends of conveyor screw 58 may be journaled in bearings 74 and 76 of the screw housing, and one end thereof may be rotationally driven by an electric motor 78 and associated speed reduced 80, FIG. 2. As previously explained, motor 78 is to be energized by an electric switch closing the circuit of said motor whenever the material heated in evaporator E reaches a predetermined maximum temperature.

Heat-responsive circuit controllers for closing and opening the circuits of the several driving motors as previously explained, are devices well known and readily available commercially. Such devices may be conventionally and very simply incorporated in the motor circuits for control of the motors as stated, wherefore a detailed disclosure of the required circuitry is considered unnecessary to a full understanding of the present invention.

In addition to the temperature sensing controls mentioned herein, electric load controls may be employed to avoid overloading the cookers and to regulate the flow of product through the system. The preheater and the evaporator preferably are controlled within predetermined load limits by means of electric load controls, so that the conveyor feeds material into the cooker or preheater as long as the load is below an upper limit, which may be for example, fifty percent of the shell capacity at which the load control stops the feed conveyor. When the load drops to fifty percent or below, the feed conveyor thereby is activated to resume feeding of material into the cooker or preheater. The temperature sensing controls and the electric load controls may be wired in series, so that two conditions, namely, correct temperature, and proper load level, must be met before the feed conveyor can resume operation.

It is to be understood that various modifications and changes may be made in structural details and in the method of operation of the device, within the scope of the appended claims, without departing from the spirit of the invention.

What is claimed is:

1. Apparatus for the rendering of oil and fat bearing raw materials comprising:
   a preheater having an entry port and first and second discharge ports;
   a heated evaporator having an entry port and first and second discharge ports;
   a heated finisher having an entry port and first and second discharge ports;
   means for conveying raw material to be rendered to said preheater entry port;
   first conveying means connected between the first discharge port of said preheater and the entry port of said evaporator for conveying material from the preheater to the evaporator;
   second conveying means connected between the first discharge port of said evaporator and the entry port of said finisher for conveying material from the evaporator to the finisher;
   means connected in common with the second discharge port in each of said preheater, evaporator and finisher for receiving material from at least one thereof; and
   valve means in said first discharge port in said finisher for controlling the release of material from the finisher through said first discharge port thereof.

2. Apparatus as specified by claim 1, wherein is included: a normally closed discharge door in the second discharge port in each of the preheater, the evaporator, and the finisher; and the means connected in common comprises a single percolator trough arranged to receive material from the preheater, the evaporator, and the finisher, when the normally closed discharge doors thereof are moved to open position.

3. Apparatus as specified by claim 2, wherein the preheater, the evaporator, and the finisher are individually chargeable with uncooked raw material, for rendering said material in individual batches collectable within the single percolator trough aforesaid.

4. Apparatus as specified by claim 1, wherein is included: means responsive to a predetermined temperature rise of material within the preheater for actuating said first conveyor means; means responsive to a predetermined temperature rise of material within the evaporator for actuating said second conveyor means; and means responsive to a predetermined temperature rise of material within the finisher, to actuate the valve means for release of material from the finisher.

5. Apparatus as specified by claim 4, wherein the valve means for controlling discharge of material from the finisher is located to discharge into a percolator trough.

6. Apparatus as specified by claim 4, wherein the temperature responsive means controlling the first and second conveyor means respond to a temperature approximating 212°, for actuating said conveyors; and the temperature responsive means for opening the valve means of the finisher, responds to a valve-opening temperature of material within the finisher ranging between about 212° and 275° F.

7. Apparatus as specified by claim 4, wherein is included: a normally closed discharge door associated with the second discharge port in each of the preheater, the evaporator, and the finisher; and the means connected in common comprises a single percolator trough receptive of material from said discharge doors when said doors are moved to open position.

8. Apparatus as specified by claim 7, wherein the valve means for controlling discharge of material from the finisher, is located to discharge into the percolator trough aforesaid.

9. Apparatus as specified by claim 8, wherein the temperature responsive means controlling the first and second conveyor means respond to a temperature approximating 212°, for actuating said conveyors; and the temperature responsive means for opening the valve means of the finisher, responds to a valve-opening temperature of material within the finisher ranging between about 212° and 275° F.

10. Apparatus for the rendering of oil and fat-bearing raw materials by the batch-rendering method or the continuous-rendering method, alternatively, said apparatus comprising in combination: an elongate preheater having an end including a discharge door, and a separate discharge port; means for feeding raw material into the preheater for processing; an elongate heated evaporator in side-by-side relationship with the preheater and having an entry port and a discharge port; a separate discharge door in an end of the evaporator; a single percolator trough arranged to receive material from the end discharge doors of both the preheater and the evaporator; an elongate heated finisher arranged in side-by-side relationship with the preheater and the evaporator, said finisher having an end in line with corresponding ends of the preheater and the evaporator, and said finisher end including a discharge door for release of material from the finisher directly into the single percolator trough aforesaid, said finisher having an entry port and a discharge port separate from the discharge door thereof; a first screw conveyor controlling transfer of material from the discharge port of the preheater through the entry port of the evaporator; a second screw conveyor controlling transfer of material from the discharge port of the evaporator through the entry port of the finisher; and valve means for discharging into the percolator trough aforesaid a quantity of material from the finisher, through the discharge port of the latter.

11. Apparatus as specified by claim 10, wherein said second screw conveyor incorporates means for pressing and draining liquefied fats and oils from the material conveyed thereby, prior to entry of said material into the entry port of the finisher.

12. Apparatus as specified by claim 10, wherein is included: means responsive to a predetermined temperature rise of material within the preheater for actuating said first screw conveyor; means responsive to a predetermined temperature rise of material within the evaporator for actuating said second screw conveyor; and means responsive to a predetermined temperature rise of material within the finisher, to actuate the valve means for release of material from the finisher to the percolator trough.

13. Apparatus as specified by claim 12, wherein said second screw conveyor incorporates means for pressing and draining liquefied fats and oils from the material conveyed thereby, prior to entry of said material into the entry port of the finisher.

14. Apparatus as specified by claim 12, wherein the temperature responsive means controlling the first and second conveyors respond to a temperature approximating 212°, for actuating said conveyors; and the temperature responsive means for opening the valve means of the finisher, responds to a valve-opening temperature of material within the finisher ranging between about 212° and 275° F.

15. Apparatus as specified by claim 10, wherein said second screw conveyor comprises: an elongate tubular housing having a cooked material entry port and a discharge port, said housing having a bottom portion apertured for draining liquefied fats and oils from the housing; an elongate conveyor screw supported for axial rotation within the housing between said ports, said screw including a series of helical flights disposed between said ports, with certain ones of said flights reduced as to pitch for exerting a compressive force upon material being advanced by the screw while rotating, thereby to express liquefied fats and oils from the material and induce drainage of said fats and oils through the bottom apertures of the screw housing while the material undergoes advancement from the entry port toward the discharge port of the housing.

16. The conveyor as specified by claim 15, wherein at least one of the conveyor screw flights adjacent to the discharge port of the housing is increased as to pitch in comparison with the pitch of the reduced-pitch flights.

17. The conveyor as specified by claim 16, wherein the conveyor screw flights of reduced pitch are located intermediate the screw ends and closer to the discharge port than to the entry port of the screw housing.

References Cited

UNITED STATES PATENTS

| | | | |
|---|---|---|---|
| 1,654,506 | 12/1927 | McTavish | 260—412.6 |
| 1,821,639 | 9/1931 | Hiller | 260—412.6 |
| 2,086,072 | 7/1937 | Fautif et al. | 260—412.6 X |
| 2,551,034 | 5/1951 | Merriman et al. | 260—412.6 X |
| 2,673,790 | 3/1954 | Illsley | 23—280 |
| 2,709,956 | 7/1955 | Napier | 100—117 X |
| 3,230,902 | 1/1966 | Grimm et al. | 100—117 X |
| 3,288,825 | 11/1966 | Keith | 23—280 X |
| 3,295,929 | 1/1967 | Allbright et al. | 23—280 |

OTHER REFERENCES

Rose: "Recovery of Animal Fats," J. Am. Oil Chem. Soc. 31:498–503 (1954).

MORRIS O. WOLK, Primary Examiner

D. G. CONLIN, Assistant Examiner

U. Cl. X.R.

23—308; 100—117; 260—412.6